UNITED STATES PATENT OFFICE.

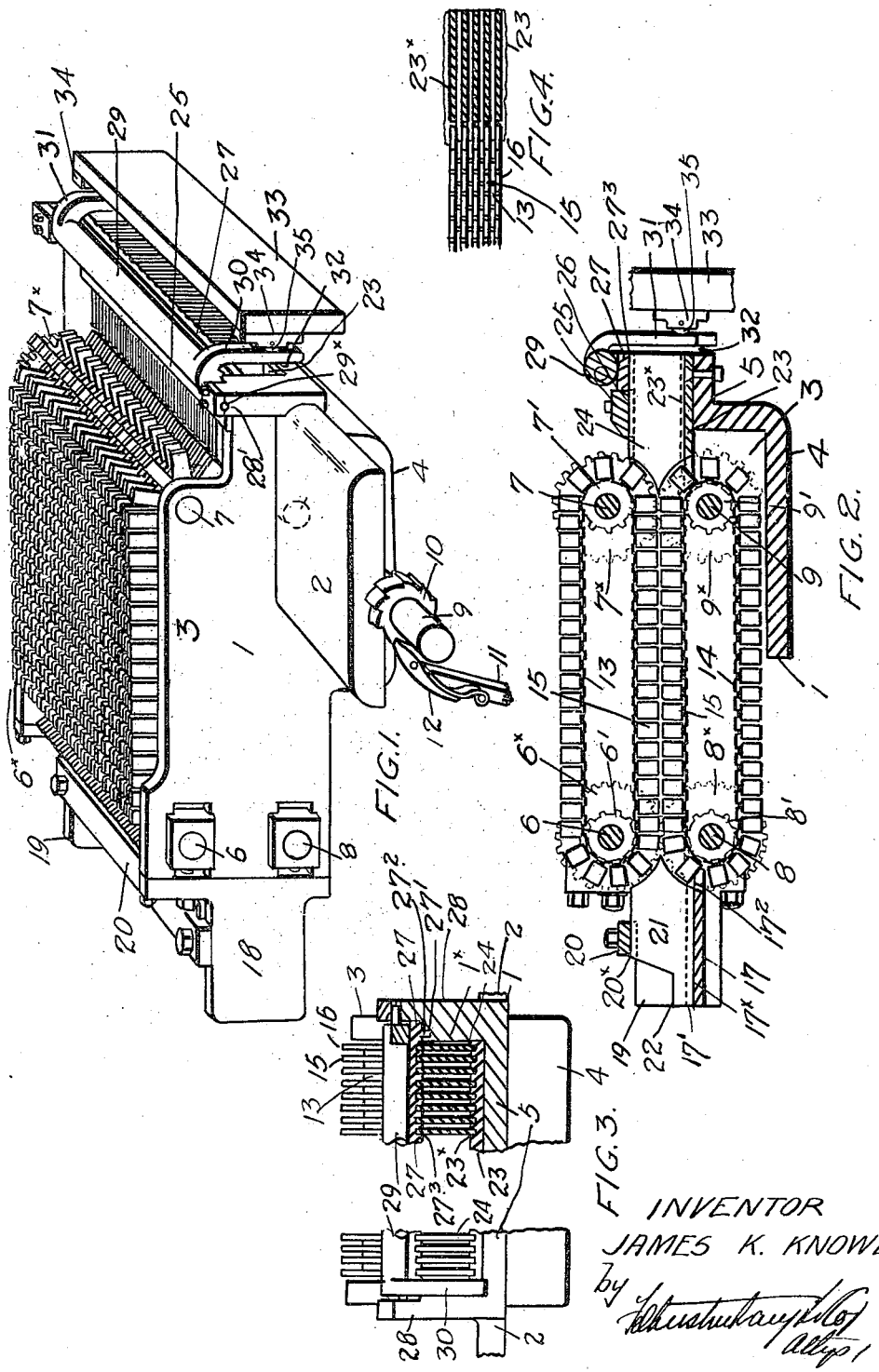

JAMES KENNETH KNOWLES, OF TORONTO, ONTARIO, CANADA.

VENEER-FEEDING DEVICE FOR MATCH-MACHINES.

1,293,802.  Specification of Letters Patent.  Patented Feb. 11, 1919.

Application filed March 5, 1918. Serial No. 220,522.

*To all whom it may concern:*

Be it known that I, JAMES KENNETH KNOWLES, of the city of Toronto, in the county of York, in the Province of Ontario, Canada, have invented certain new and useful Improvements in Veneer-Feeding Devices for Match-Machines, of which the following is the specfication.

My invention relates to improvements in veneer feeding devices for match machines and the object of the invention is to devise means for reducing the friction between the sides of the veneer and the opposing sides of the feed guides to a minimum and at the same time providing means for holding the veneer positively in a stationary position during cutting of the match splints as hereinafter more particularly explained.

Figure 1, is a general perspective view of my feed device.

Fig. 2, is a longitudinal section through Fig. 1.

Fig. 3, is an end view partially in section.

Fig. 4, is a fragmentary plan view showing a portion of the movable feed guides and the corresponding stationary receiving guides.

In the drawings like letters of reference indicate corresponding parts in the various figures.

1 indicates a casting which is provided with wings 2 by which the casting is supported. The casting 1 comprises side members 3 connected together by a cross web 4, the cross web 4 being provided with an outturned horizontal cross portion 5 forming a support for the receiving table on to which the veneer is fed. 6 and 7 indicate a pair of parallel upper shafts journaled in suitable bearings carried by the side portions 3 of the main casting 1. 8 and 9 indicate a pair of lower shafts located in vertical alinement with the shafts 6 and 7 and also journaled in bearings formed in the side portions 3 of the main casting 1. The shafts 6 and 8 are connected together by intermeshing gears $6^x$ and $8^x$. The shafts 7 and 9 are connected together by intermeshing gears $7^x$ and $9^x$. One of the shafts 6, 7, 8 or 9 is provided with a ratchet gear 10.

11 indicates the upper end of a pitman carrying a spring held pawl 12 held in mesh with the ratchet gear 10. The pitman 11 is reciprocated by any suitable mechanism commonly employed for this purpose and thereby imparts a step-by-step movement to the shaft 9 and through the gears $9^x$, $7^x$, $8^x$ and $6^x$ to the other shafts 7, 6 and 8, the shafts 6 and 7 being connected by sprocket gears 6' and 7' and sprocket chain 13, the shafts 8 and 9 being connected together by sprocket gears 8' and 9' and sprocket chain 14. Each alternate link of the sprocket chains 13 and 14 is provided on each side with opposing plates 15 and 16 (see Fig. 4) thereby forming an intervening channel, the plates of the links of one chain being in alinement and normally where the chain 13 or 14 is passing horizontally in close proximity one to the other.

It will thus be seen that the opposing horizontal portions of the chains 13 and 14 carry oppositely directed plates, that is, the plates of the sprocket chain 13 depending and the plates of the sprocket chain 14 extending upward into close proximity with the plates of the chain 13, the plates of the chains 13 and 14 being in vertical alinement. By this means a continuous channel is formed between the chains 13 and 14, such channel being continuously movable as the chains revolve around sprockets which carry them.

17 indicates a feed table, which is carried by the side castings 18 and 19 connected together by a cross bar 20. The upper face of the table 17 is provided with a series of cross grooves $17^x$. The lower face of the bar 20 is provided with opposing cross grooves $20^x$. 21 indicate plates, which fit in the grooves $17^x$ and $20^x$ and are in line with the opposing plates 15 and 16 of the chains 13 and 14 and thereby forming a continuation of the channel formed by the plates 15 and 16. The inner end of the plate 21 is formed in arcs concentric with the center of the shafts 6 and 8 so as to fit into close proximity to the path of the plates 15 and 16 as they revolve around the sprockets 6' and 8'. The plate 21 at its outer side is reduced at 22 in order to allow of the easy insertion of the veneer.

It will, of course, be understood that the upper face of the table 17 indicated by the dotted line 17' is in horizontal alinement with the upper edge of the sprocket chain 14. The table 17 is provided with forwardly projecting portions $17^2$ which extend between the plates 15 and 16 so as to make the bottom of the channel formed by the upper face of the table 17 as nearly continuous as possible with that portion of the channel formed by the links of the chain 14.

23 indicates the receiving table, which is similar in form to the table 17, being provided with cross grooves 23ˣ in which plates 24 fit, the inner ends of the plates 24 being also formed with arc-shaped portions concentric with the center of the shafts 7 and 9.

25 indicates a cross bar provided with cross grooves 26 in which the upper edges of the plates 24 fit. The ends of the bars 25 are suitably secured by bolts or other suitable means to the upper edges of the side portions 3 of the casting.

The main casting 1 is provided with shoulder portions 1ˣ on which the ends of a bar 27 rest, such shoulder portions being provided with small holes 27′. 27² indicate pins which depend from the bar 27 and fit into the holes 27′ thereby securely holding the bar in position from horizontal movement. The bar 27 is also provided with cross grooves 27³ in which the plates 24 fit, the intermediate portion between each of the grooves extending between the plates so as to bear upon the upper edges of the veneer strips passing through guideways formed by the plates 24.

28 indicate upwardly extending portions which form part of the main casting 1. 29 indicates an eccentric roller provided with end trunnions 29ˣ which are journaled in bearings 28′. The roller 29 is provided with depending arms 30 and 31, which are spring held outwardly by means of compression springs 32.

33 represents a portion of the cutting head of a match machine. 34 indicates bearings carried by the portion 33 of the cutting head and in which are journaled rollers 35, which as the cutting head descends, come into engagement with the arms 30 and 31 to force them inwardly against the pressure of the spring 32 thereby turning the eccentric roller so as to carry the major radius thereof into contact with the bar 27 thereby forcing such bar downwardly into contact with the veneer.

It will thus be seen that as the veneer strips are fed into the guides formed by the stationary plate 21 and into the movable guides formed by the plates 15 and 16 such veneer strips are carried forward by a step-by-step movement. The frictional contact between the side of the veneer strip and the sides of the movable guides serves to carry such strip forward. It will, therefore, be seen that there will be no friction caused by the relative movement of the veneer strip and the sides of the movable guides as such sides move along with the strip carrying it forward to the receiving table 23, such forward motion being produced by a step-by-step movement as hereinbefore described.

The veneer strip as it is carried forward by the movable guides passes through the stationary guide portion formed by the plates 24.

It will be readily understood that the machine is so timed with the movement of the head of the match machine that such head is in its raised position during feeding movement and that, therefore, the arms 30 and 31 are thrown outward at such time by the springs 32, relieving the bar 27 from the pressure of the eccentric roller 29 and allowing the veneer strips to be fed into position beneath the cutting tools, which are carried by the head and which are not shown, as they do not form part of the present invention. As soon as the head of the match machine descends the feed movement stops and the roller 35 engages the arms 30 and 31 forcing them downward and inward against the pressure of the springs 32 thereby turning the eccentric roller 29 so as to force the bar 27 downward and into engagement with the veneer strips thereby securely clamping them in place. This action, of course, takes place immediately prior to the engagement of the cutting tools of the match machine with such strips. As soon as the match splints are cut the head of the match machine again ascends thereby automatically releasing the veneer strips allowing them to be fed forward by the next step-by-step movement.

From this description it will be seen that I have devised a very simple device whereby veneer strips may be fed forward to the cutting tools of the match machine with a minimum amount of friction.

It is understood that the great detriment to any match machine designed to cut splints from veneer strips has been that there has been so much friction between the veneer strip and the side guideways through which it passes during feeding movement that it has been found impossible to produce an even and quick feed, which is essential to the proper cutting of the match splints.

By my device it will be seen that the friction is practically reduced to the vanishing point, the only frictional contact being between the plates 21 and 24, the major portion of the veneer being held in the movable guides formed by the plates 15 and 16 and that, therefore, all veneer strips are carried forward to an equal extent at each movement. As soon as such feed movement is accomplished the veneer strips are held positively in position during cutting so that an even splint of equal thickness is always insured.

What I claim as my invention is.

1. In a veneer feeding device, an endless conveyer suitably supported and driven and on to which the veneer is drawn edgewise, and plates extending from the links of the conveyer in frictional contact with the sides of the veneer carried by the conveyer.

2. In a veneer feeding device, a pair of parallel endless conveyers suitably supported and driven and lying in the same plane, and plates extending from each conveyer so that the two adjacent parallel portions of the conveyers form with the plates a movable channelway.

3. A veneer feeding device for match machines comprising a feeding table and receiving table provided with alined vertical guides, endless horizontal conveyers located in vertical alinement, the lower conveyer being in horizontal alinement with the upper face of the feeding table and receiving table, and a series of plates extending outwardly from the conveyers to form a movable channelway between each of such conveyers.

4. A veener feed device for match machines comprising a feeding table and receiving table provided with alined vertical guides, an interposed movable guide mechanism carrying the veneer strips from the feeding table to the receiving table, an eccentric roller held in suitable bearings having depending arms resiliently held in their outward position, and means adapted to be carried by a cutting head of a match machine for engaging such arms to compress them against the resilient means whereby the major radius of the eccentric roller is carried into engagement with the pressure bar.

5. In a veneer feed device for match machines, a feeding table and receiving table, each comprising a horizontally alined feed plate having alined cross grooves, vertical plates held within such cross grooves, a cross bar having cross grooves into which the upper edges of the aforesaid plates fit, and a traveling guide interposed between and in alinement with the vertical plates of the feed table and receiving table and adapted to carry veneer strips from the feed table to the receiving table.

6. In a veneer feed device for match machines, a feeding table and receiving table, each comprising a horizontally alined feed plate having alined cross grooves, vertical plates held within such cross grooves, a cross bar having cross grooves into which the upper edges of the aforesaid plates fit, a traveling guide interposed between and in alinement with the vertical plates of the feed table and receiving table and adapted to carry veneer strips from the feed table to the receiving table, and comprising a pair of upper parallel shafts and a pair of lower parallel shafts, sprockets carried by the upper and lower shafts, conveyer chains connecting the upper shafts together and conveyer chains connecting the lower shafts together, a suitable connecting gear whereby the shafts rotate in unison, step-by-step driving means connected to one of the shafts and plates extending outwardly from each side of each link of a chain conveyer to form guide channels into which veneer is designed to feed.

JAMES KENNETH KNOWLES.

Witnesses:
M. EGAN,
R. MOFFAT.

Copies of this patent may be obtained for five cents each, by addressing the "Commissioner of Patents. Washington, D. C."